April 24, 1962     A. G. BODINE     3,030,715
SONIC WAVE EARTH DIGGING AND MOVING MACHINES
Filed Sept. 10, 1959     6 Sheets-Sheet 1
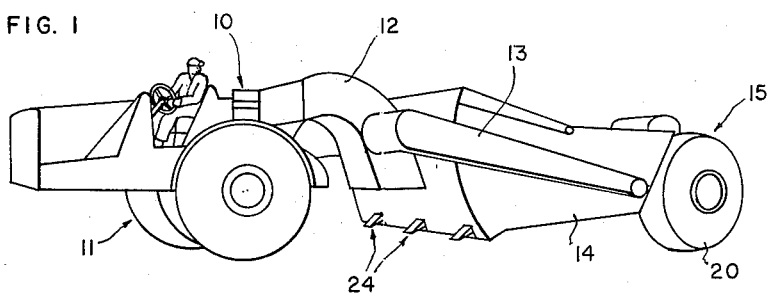
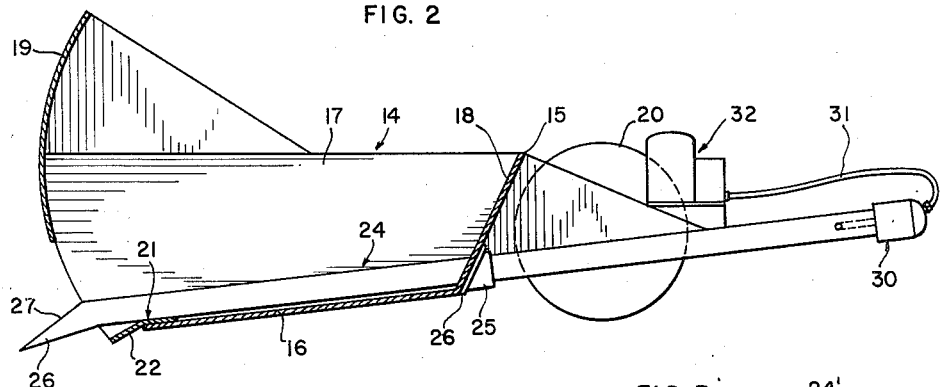
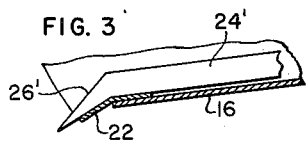
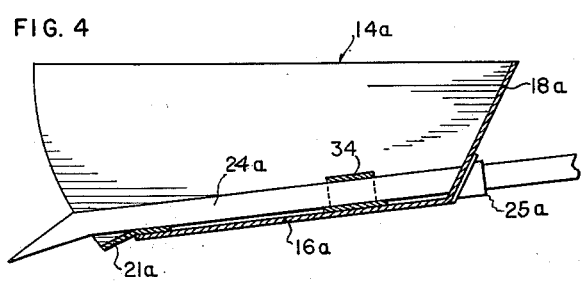
INVENTOR.
ALBERT G. BODINE
BY
ATTORNEY April 24, 1962  A. G. BODINE  3,030,715
SONIC WAVE EARTH DIGGING AND MOVING MACHINES
Filed Sept. 10, 1959  6 Sheets-Sheet 2
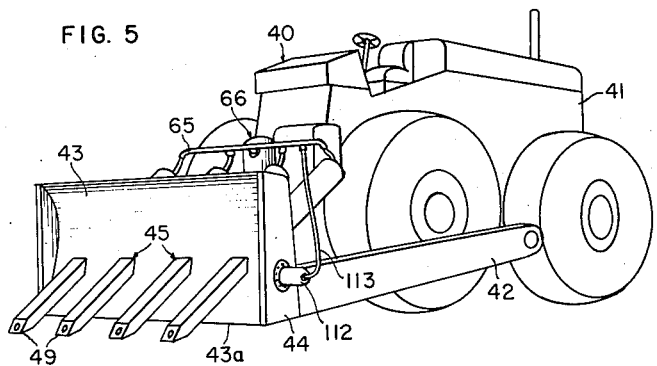
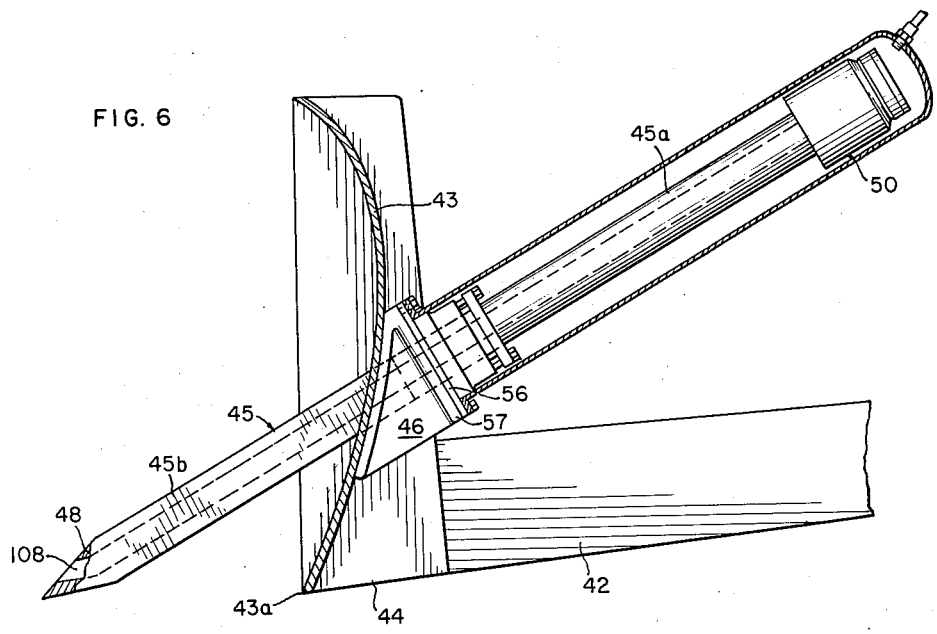
INVENTOR.
ALBERT G. BODINE
BY *Lilly and Nyhagen*
ATTORNEYS April 24, 1962 A. G. BODINE 3,030,715
SONIC WAVE EARTH DIGGING AND MOVING MACHINES
Filed Sept. 10, 1959 6 Sheets-Sheet 3
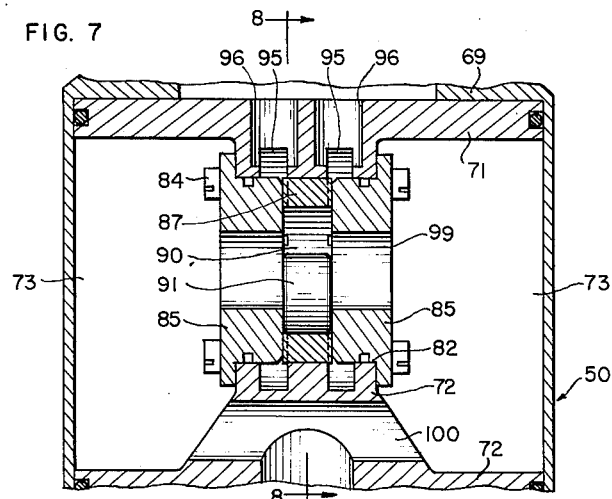
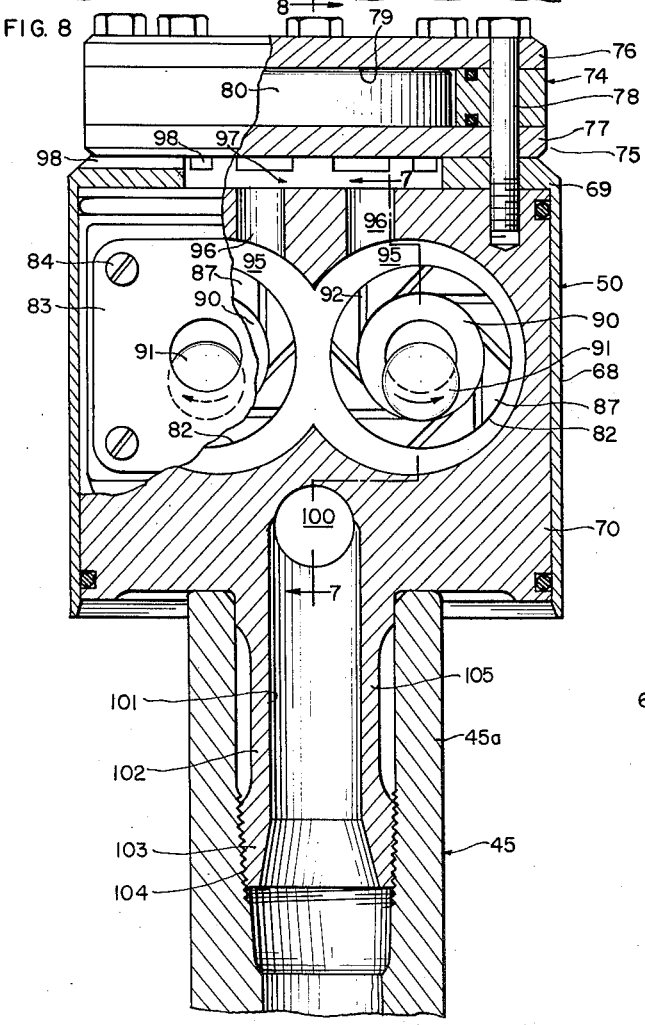
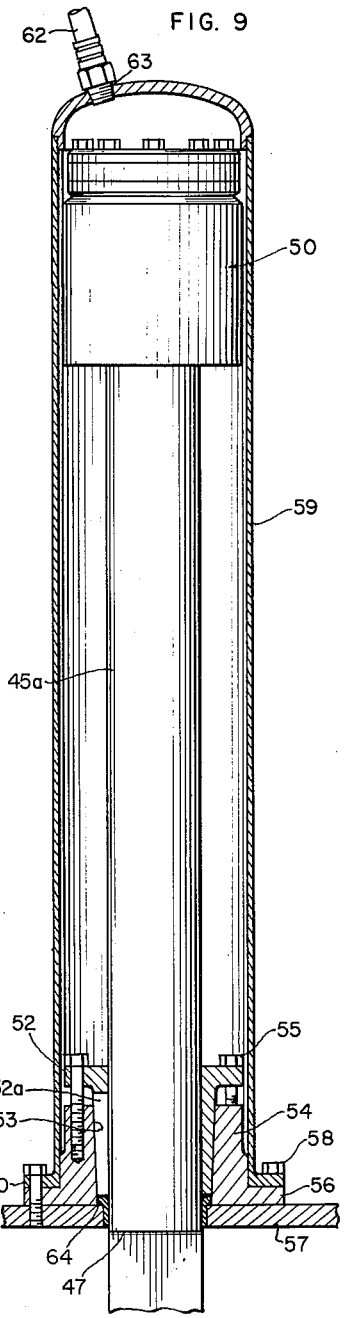
INVENTOR.
ALBERT G. BODINE
BY
ATTORNEYS

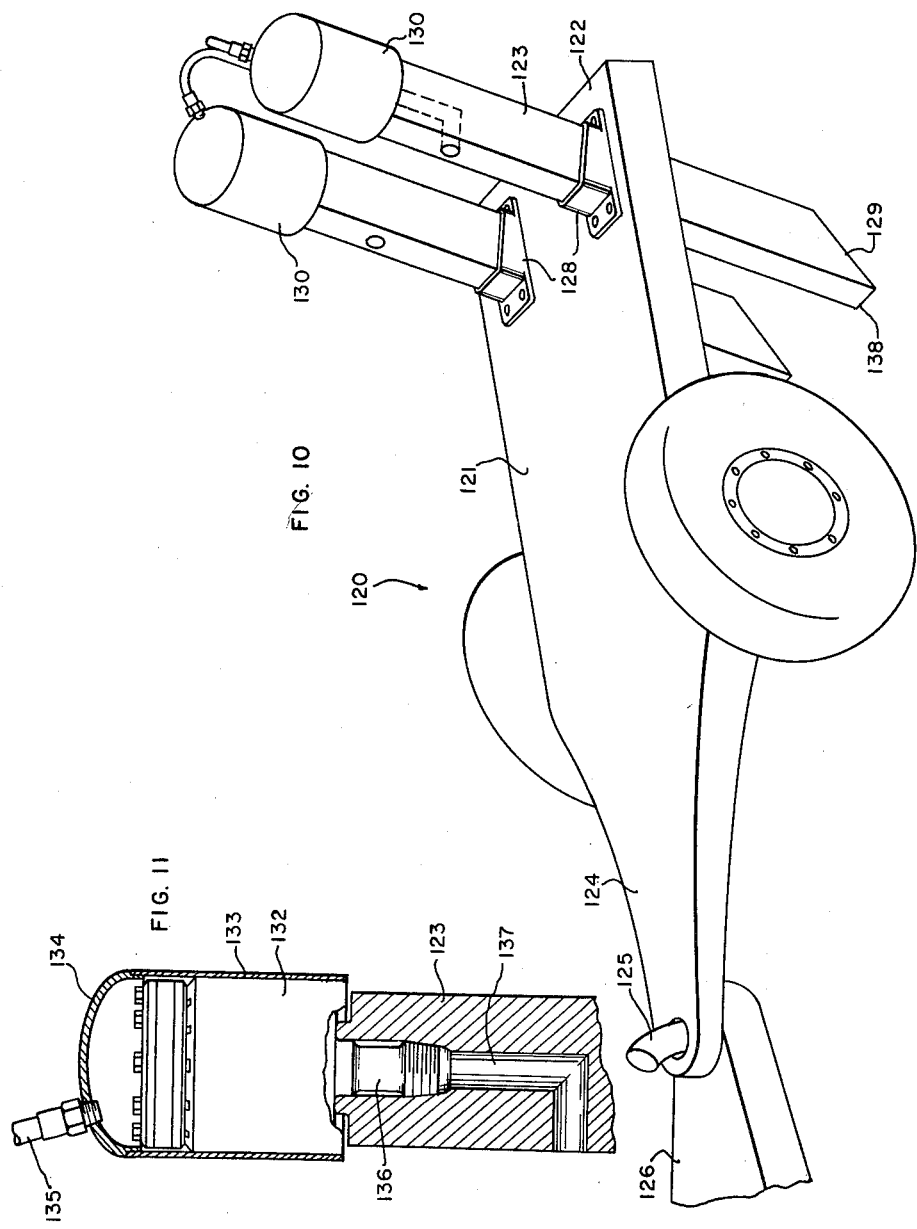

April 24, 1962   A. G. BODINE   3,030,715
SONIC WAVE EARTH DIGGING AND MOVING MACHINES
Filed Sept. 10, 1959   6 Sheets-Sheet 5
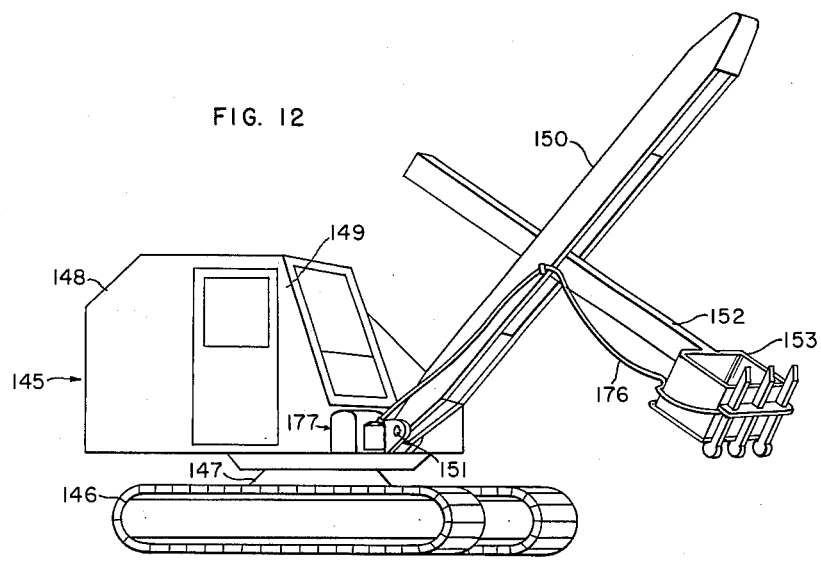
FIG. 12
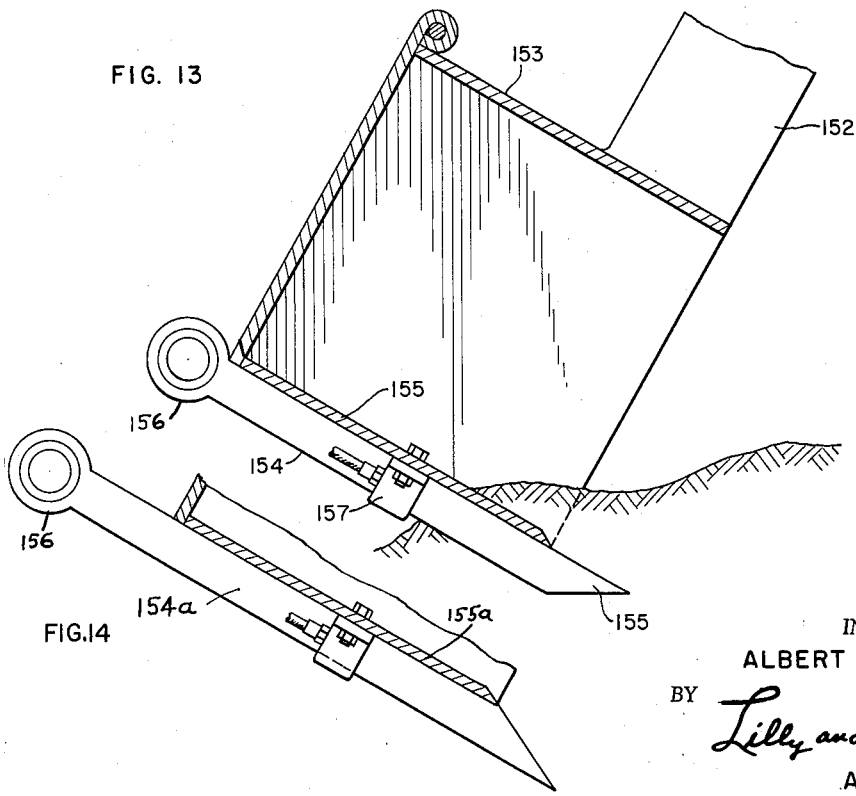
FIG. 13
FIG. 14
INVENTOR.
ALBERT G. BODINE
BY *Lilly and Nyhagen*
ATTORNEYS April 24, 1962          A. G. BODINE          3,030,715
SONIC WAVE EARTH DIGGING AND MOVING MACHINES
Filed Sept. 10, 1959          6 Sheets-Sheet 6
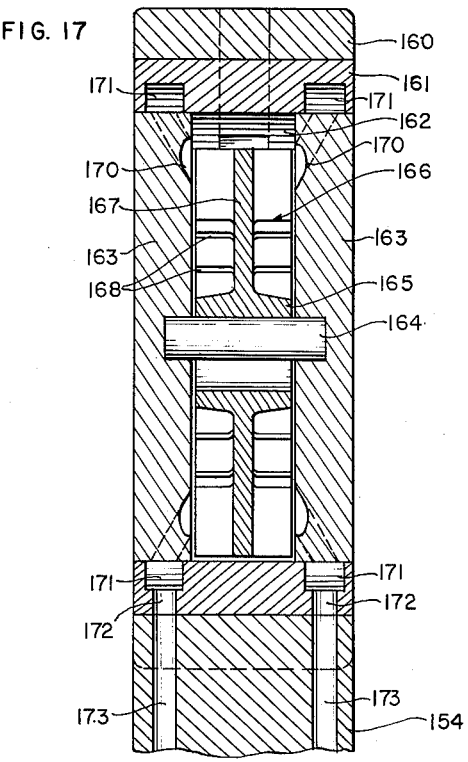
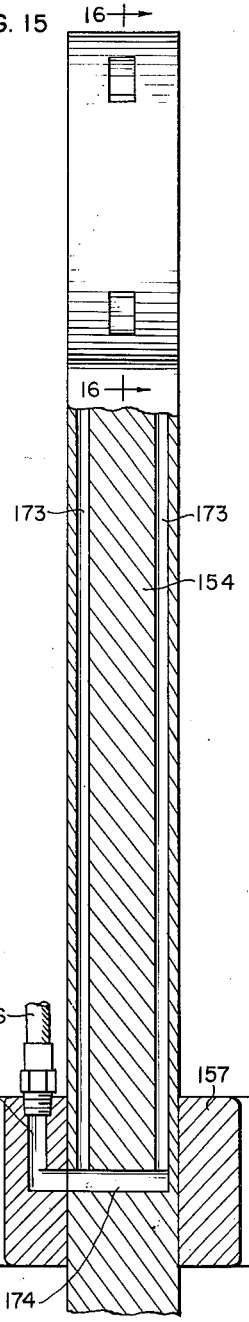
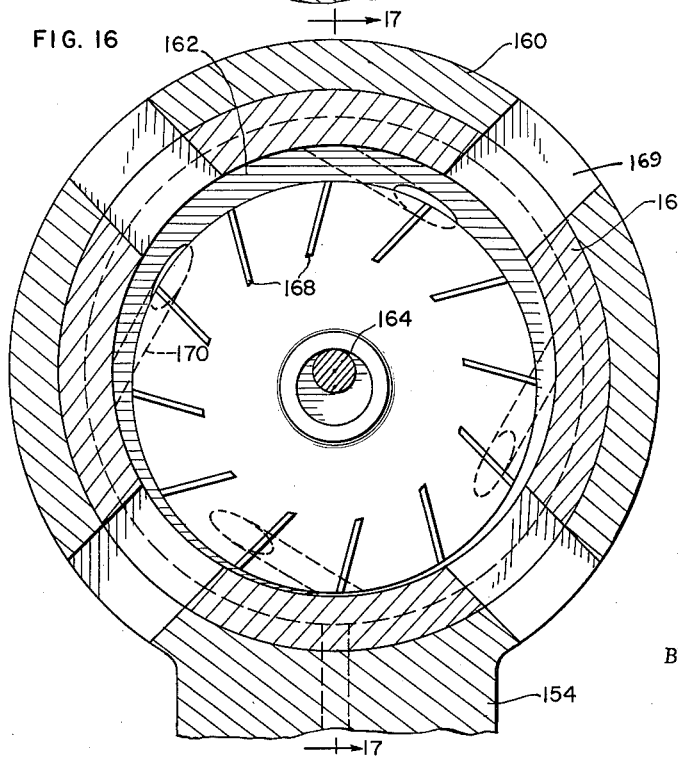
INVENTOR.
ALBERT G. BODINE
BY Lilly and Nyhagen
ATTORNEYS

3,030,715
SONIC WAVE EARTH DIGGING AND MOVING MACHINES
Albert G. Bodine, 13120 Moorpark St., Sherman Oaks, Calif.
Filed Sept. 10, 1959, Ser. No. 839,196
11 Claims. (Cl. 37—195)

This invention relates generally to earth digging and moving machines such as scrapers, dozers, graders, shovels, hoes, rippers, etc., and its general object is to equip such machines with sonic wave means to facilitate and improve cutting and loading of earth.

Machines of this kind have a cutting element such as a blade, or ripper bars, for parting and penetrating into the earth. In the case of certain machines, such as scrapers and shovels, the earth cut by the cutting element is loaded into a carrier shell, usually known as the bowl in the case of a scraper, or the bucket in the case of a shovel.

In such machines, the earth is parted by the cutting element, which is in effect "pushed" into it. The cutting element meets a compression resistance presented by the earth, which in the case of some earthen materials is very substantial. Speaking particularly of scrapers, as representative, though without limitation thereto, when resistance is so high that the tractor lugs down, or loses traction, the depth of cut must be reduced, often to the point of "peeling" off a relatively thin slice. This is an undesirable condition, as an increased number of cuts must then be taken to remove a given volume of earth, "loading" of the cut earth into the scraper bowl is known to be generally less effective with a thin slice, and abrasive wear on the cutting blade is increased.

In general, a deep cut is most to be desired, and the machine is normally set for as deep a cut as the power of the tractor will permit, as mentioned above. Problems arise, however, not only in making the cut, but in "loading" the bowl, i.e., inducing the cut earth to move up into and completely fill the bowl. Ordinarily, a deep cut facilitates loading. The thick slice aids in heaping the earth into the bowl. However, as the bowl fills, the incoming earth must be forced up a steeper and steeper incline, and an increasing share of tractor power must be diverted from cutting to loading, in order that there will be sufficient thrust to accomplish the latter. The point is regularly reached where the depth of cut must be reduced to reduce the share of available tractor power required for cutting in order to have available the necessary power for continued loading. Heavy soils must commonly be taken in thin cuts to reduce the power required for cutting and make available sufficient power for loading.

Scrapers also frequently encounter problems with certain hard or rocky ground which the blade either will not cut, or which require so much tractor power for cutting that insufficient power remains for loading.

It is accordingly among the objects of the invention to improve the penetrability of the cutting edges of earth moving machines into the earth, to facilitate deeper cutting, to improve cutting in heavy, hard, or rocky earth materials, and to facilitate loading of the cut material into the carrier shell, using novel sonic wave vibration methods and means in conjunction or combination with such machines.

I have discovered that the application of sonic wave energy to earthen materials through or in the vicinity of a cutting element greatly facilitates its cutting or fragmentation, such that certain resistant soils may be cut in thicker layers with moderate tractor power, and others, so hard or rocky that they can not be cut conventionally, are readily dug or fragmented.

The improvement is due in large part to the fact that the sonic wave subjects the earthen material to a sonic cycle causing it to undergo a cyclic state of tension, with the result that it breaks apart owing to elastic fatigue. Earthen material is very weak under tension, and gives way very readily and rapidly when caused to undergo alternating compression and tension under the influence of a sonic wave. Moreover, in combination with a blade in pressural engagement with the earthen material, the applied sonic wave energy causes the severed earthen material to become dynamically fluidized and suspended, and, in its sonically agitated state, to acquire high mobility, such that it moves readily past the blade, with greatly reduced surface friction. Ease of penetration of the blade and ease of loading are thereby greatly improved.

The increased ease by which the cut is made not only permits cutting with given power, but increases the speed by which the cut may be made. The overall speed of the operation is thereby improved, enabling the handling of greater tonnage per day.

Because of the increased ease of penetration, the blade depth and orientation become less critical, so that less attention need be paid to these formerly bothersome factors.

The increased ease of penetration also results in the power of conventional tractor engines becoming more adequate to the demands placed upon it, with the practical results that less engine tuning is required, and the occasions on which booster or helper machines are required are reduced in frequency, if not virtually eliminated.

As regards "loading," particularly in the cases of scrapers or shovels, the aforementioned dynamic fluidizing effort of the sonic wave activity or sonic "field" in the cut earthen material, and the general state of sonic wave agitation therewithin, place the material in a condition of dynamic suspension and high mobility. In this fluidized and highly mobile condition, the travel of the cut earthen material over the blade and into the bowl of the scraper takes place with increased facility, and with a reduction in thrust required of the tractor. The fraction of tractor power devoted to loading is thus reduced.

Sonic wave activity is applied within the scope of the broad invention in various ways. One application illustrative of a number of aspects of the broad invention is in a scraper, of the type having, among other conventional components, a cutting blade, a so-called bowl, immediately in the back of the blade, into which material cut by the blade is loaded by virtue of forward motion of the machine, and means for lowering and elevating the bowl and blade. In accordance with the invention, the bowl is equipped with a plurality of toothed longitudinally extending bars, which project forwardly of the blade, so as to engage the earth a short distance ahead of the blade. These bars, which are composed typically of a good grade of alloy steel, are set into a longitudinal mode of sonic standing wave vibration by sonic wave generators. In a preferred form, the bars are mounted on the scraper at or near their midpoints, and are set into half-wavelength standing wave vibration, the wave generators most conveniently and effectively being mounted on the rearward ends of the bars. If the generators deliver alternating forces to the rearward ends of the bars in a direction longitudinally thereof and at a frequency $f$ equal to $S/2L$, where $S$ is the speed of sound in the material of the bar, and $L$ is its length, the bar will undergo resonant longitudinal half-wavelength standing wave vibration. Such a bar is known in the science of acoustics as a half-wavelength bar. The theory of longitudinal waves in bars is well understood in the science of acoustics, and it will suffice here to explain that in half-wave length standing wave vibration, each half-length of the bar alternately elastically elongates and contracts at the frequency of operation of the wave generator. It will be understood that the two half-lengths elastically elongate simultaneously with one another and elastically contract simultaneously with one another. The extent of elastic elongation or contraction is minimized at the midpoint of the bar, and progressively increases, for successive increments of length of the bar, from its midpoint to its two extremities. In standing wave vibration of the type in question, the point of minimized vibration amplitude, at the midpoint of the bar, is termed a velocity node, and the two points of maximized vibration amplitude, at the extremities of the bar, are termed velocity antinodes. It will be clear that the bar does not vibrate bodily or as a whole.

Half-wavelength vibration must also be understood as a resonant phenomenon, occurring when the frequency of generator operation is such that the inertia reactance of the bar is equal to the elastic stiffness reactance thereof. In the region of this resonance frequency, maximized amplitude of vibration is attained at the extremities of the bar for a wave generator of given power. It should also be mentioned that the described type of elastic wave vibration in a bar of extended length is within the broad class of elastic vibratory systems of the "distributed constant" type.

In operation, and still referring to application of the invention to a scraper, the pointed or toothed end of the bars, engaged with the earth, and pressed thereagainst by the effort exerted by the tractor vehicle, act to radiate into the earth material sonic waves which may, depending upon their length, be of the order of 400 to 1000 cycles per second. Using a generator of adequate power, and operating safely within the maximum stress to which the bar should be subject, a vibration amplitude may be attained at the tooth of the order of 0.06″. The bar, after contraction, elongates with an acceleration many times the acceleration of gravity, and it should be evident that great vibratory force is delivered to or applied against the earth, also, a strong sonic wave is radiated into the adjacent earth material.

The sonic wave radiation into the earthen material is responsible for fracturing the earth ahead of the tooth.

The wave stress is of comparatively large amplitude, and the repeated cyclic tension or rarefaction phase of the wave causes the earthen material to fail or disintegrate as a result of elastic fatigue. The sonic wave radiated into the fragmented earth also has the very advantageous effect of causing the earthen material to become dynamically fluidized and suspended, and of high mobility, facilitating its loading into the bowl over the scraper blade, as mentioned hereinabove.

It should be mentioned that the effectiveness of sonic wave radiation into the material, and therefore the rate of disintegration thereof, depends directly upon the mean pressure with which the toothed bars are engaged with the earth. In other words, the sonic "coupling" efficiency depends upon mean tooth pressure against the earth. In the case of a scraper, this in turn depends, of course, upon tractor effort. That is to say, when the tractor, or other transport vehicle, is driven forward, the toothed bars are forced into pressural engagement with the earth.

Further, a unique and surprising advantage of the system is that sonic coupling effectiveness of the bars against the earth is automatically improved with increased earth resistance, in accordance with increased tractor effort exerted at such time. As earth resistance increases, the effect of tractor effort is felt as increased pressure between the bar teeth and the formation. The sonic wave pressure then takes place about this increased tooth pressure as a mean. With increased mean pressure, sonic coupling effectiveness, and therefore the amplitude of the sonic wave radiated from the bar, are increased. Thus the more difficult the "going," the better will the sonic bars operate to disintegrate the earthen material.

The longitudinally vibratory toothed bars may also be given a lateral or transverse component of vibration, with the result that the tip of the tooth describes an elliptical or other path having both longitudinal and transverse components of motion. It has been found that such a motion path for a sonically driven cutting element is of increased efficacy in cutting certain materials.

The toothed bars may project considerably in advance of the cutting edge of the scraper blade, in which case they function primarily to disintegrate the earthen material ahead of the blade; or in other cases, for emphasis of other effects, they may be located at or almost immediately adjacent the blade edge. In the latter case they direct their radiated sound waves into the earth right at the point of blade resistance presented by the earth, and thereby act to disintegrate the earthen material where it is being engaged by the blade edge. In the latter case also, the benefit from dynamic fluidizing and suspension of the cut earth by the radiated sonic field, as regards facilitation of "loading," tends to be maximized.

It is also within the scope of the invention to utilize the blade itself as a sonic wave radiator, and such may be accomplished, for example, by mounting the blade to the sonically vibrating bars near the forward extremities of the latter, in which case the blade moves relatively to the bowl. Sonic wave action may also, or alternatively, be imparted to the floor of the bowl or bucket itself, and therefore to its forward edge, or to any blade or teeth carried thereby.

In case the bowl, bucket or blade, or the lower wall or floor of a bowl or bucket, is to be subjected to vibration, it is possible to proceed in at least four general ways, all of which present some advantages, but some of which are of much greater advantage than others. The obvious procedure (not considered to be a part of the present invention) is simply to mount a vibrator on the bowl, bucket, or blade, in a manner to cause "forced" bodily vibration thereof. By forced bodily vibration, I mean the conventional concept of nonresonant mechanical vibration, i.e., "brute force" shaking, not involving either resonance phenomena or sonic wave transmission. The advantage gained by such a system, however, is of low order as compared with the attainments of various forms of the present invention.

In accordance with a beginning form of the present invention, the bowl-mounted vibrator can, with very greatly increased advantage, be operated at a frequency at which the floor of the bucket or bowl, or the entire bucket, bowl, or blade, has a natural resonant frequency. Thus, for example, the bucket, bowl or blade may be so mounted or suspended in or by the machine as to be capable of resonant vibration of a bodily type. This results when the mass or inertia reactance of the bowl, bucket or blade approximates the elastic stiffness reactance of its mounting or suspension arrangements for the frequency of operation of the vibrator. Since the amplitude of vibration at resonance is very materially magnified, very great improvement may be gained thereby. However, the mass of a scraper bowl, or of a shovel bucket, is characteristically rather large, whereas the elastic stiffness of its supporting arrangements is characteristically relatively small. Both of these factors lower the resonant frequency, and the result is that a bodily vibratory bowl or bucket, operated at resonance, may have a somewhat low resonance frequency. The advantage gained by resonant bodily vibration may thus, because of enforced low frequency operation, not be all that might be attained in other forms of the invention.

In accordance with an improved form of the invention, the resonant frequency of the system is greatly increased by utilization of a blade, bowl or bucket, which vibrates elastically, rather than bodily. The vibratory system can be entirely of the "distributed constant type," wherein the parameters of elastic stiffness and mass are distributed throughout the system, or can be of the "lumped constant" type, characterized by localized concentrations of mass and elastic stiffness which act like interconnected weights and springs. For example, a bucket or bowl may have localized areas of increased wall thickness, or regions reinforced by heavy ribs or the like, such as will act as weights, and may also have thin wall sections well adapted to elastic elongation and contraction, such as will act as springs. Such a structure will vibrate elastically as a "lumped constant" system, and will have a much higher resonant frequency, and much higher effectiveness, than a mere bodily vibratory bowl or bucket.

The most effective form of vibratory system in accordance with the invention, is that of the "distributed constant" type, wherein the blade, bowl or bucket structure vibrates in a standing wave pattern, generally of a complex type, but with definite regions of minimized wave velocity (velocity nodes), and other definite regions of maximized wave velocity (velocity antinodes). It will of course be understood that in the utilization of a sonic standing wave system, a velocity antinode region is located adjacent the cutting element, be the latter a tooth or a blade edge. It is also to be understood that whereas the primary form of my invention contemplates sonic wave action towards and from the earth material to be cut or disintegrated, other forms of the invention contemplate components of vibratory motion in other directions, for example, parallel to the edge of the blade.

Applications of the invention to earth digging or moving machines other than scrapers and shovels will be disclosed in the ensuing specification and drawings.

In the drawings, showing a representative number of illustrative embodiments of the invention:

FIG. 1 is a perspective view of a conventional type of scraper equipped with improvements in accordance with the invention;

FIG. 2 is a longitudinal sectional view, largely diagrammatic, of the machine of FIG. 1;

FIG. 3 is a detailed view showing a modification of FIG. 2;

FIG. 4 is another detail showing a further modification of FIG. 2;

FIG. 5 is a perspective view of a dozer equipped with improvements in accordance with the invention;

FIG. 6 is a vertical longitudinal section taken through the blade and sonic vibratory bars of the embodiment of FIG. 5;

FIG. 7 is a sectional view of the vibration generator of FIGS. 5 and 6, taken on broken line 7—7 of FIG. 8;

FIG. 8 is a sectional view taken on broken line 8—8 of FIG. 7;

FIG. 9 is a view similar to a portion of FIG. 6, with mounting arrangements for the vibratory bar shown in section;

FIG. 10 is a perspective view of a ripper bar machine in accordance with the invention;

FIG. 11 is a longitudinal sectional view through the upper, rearward extremity of a bar of the machine of FIG. 10, showing the generator in elevation and the generator casing in section;

FIG. 12 shows a shovel equipped with improvements in accordance with the invention;

FIG. 13 is a longitudinal sectional view through the bucket and vibratory bars of the shovel of FIG. 12;

FIG. 14 shows a modification of FIG. 13;

FIG. 15 shows the rearward half-portion of one of the vibratory bars of FIGS. 12 and 13, with portions broken away to show underlying structure in section;

FIG. 16 is a section taken on line 16—16 of FIG. 15; and

FIG. 17 is a section taken on line 17—17 of FIG. 16.

In FIGS. 1 and 2 of the drawings, a conventional type of tractor scraper is somewhat diagrammatically or conventionally indicated at 10, equipped with improvements in accordance with the invention as presently to be described. A two-wheeled engine carrying tractor unit is shown at 11. This unit is equipped at the rear with the usual gooseneck fixture 12 pulling yoke 13, the two arms of which are connected at their rearward ends to bowl or shell 14 of the two-wheeled rearward transport unit 15 in well known manner. Bowl 14 is conventional, including bottom wall 16, side walls 17 and rearward wall 18, and it will be understood that the bowl is supported at the rear through conventional frame structure by the axle, not shown, for rear wheels 20. It will further be understood that the bowl is conventionally equipped with ejector mechanism, not necessary to show herein, and with usual gate or apron 19. The bowl is capable of being elevated or lowered by usual hoisting mechanism, not shown, conventionally carried by fixture 12. The bottom wall 16 of the bowl is equipped at its forward edge with an earth engaging lip in the form of the usual blade 21, having a somewhat downwardly deflected earth engaging portion 22 terminated in the usual cutting edge. A plurality of longitudinally elastically vibratory toothed steel bars 24, here shown to be three in number, extend longitudinally through bowl 14 closely adjacent bottom wall 16, and extending through suitable apertures in rearward bowl wall 18. The midpoints of the bars 24 are closely adjacent rearward bowl wall 18, and are mounted on the latter by means of fixtures 25. The bars 24 may be rectangular or square in cross-section, and extend through correspondingly shaped openings in fixtures 25. The latter are tightly mounted on the bars, as by means of a shrink-fit, and include mounting plates 26 which may be secured to rearward wall 18 in any suitable manner. The toothed forward extremities 26 of bars 24 project somewhat in advance of blade 21 and are beveled or sharpened, as indicated at 27. They may also be deflected downwardly somewhat, so as to be carried at approximately the level of the cutting edge of the blade, as clearly illustrated in FIG. 2.

Secured to the rearward extremities of bars 24 are individual sonic wave generators 30, powered pneumatically through hoses 31 leading from air compressor plant 32 carried on unit 15. Illustrative examples of these generators 31 will be described hereinafter, but for the time being they may be described simply as having the function of exerting an alternating force on the rearward ends of the bars in a direction longitudinally thereof at a frequency equal to or in the range of the resonant frequency of the bars for the desired longitudinal mode of standing wave vibration thereof. Generally, though not necessarily, a half-wavelength standing wave is set up in the bars, and for this purpose, the generators are adapted to deliver an alternating force to the ends of the bars at a frequency equal to $S/2L$ where S is the speed of sound in the material of the bar and L is the length thereof. Taking the value of S to be equal to 16,000 feet per second, and assuming a bar of a length of 20 feet, the frequency delivered by the wave generator will then be nearly 400 cycles per second.

Thus, as described in the introductory portion hereof, the toothed forward half portions of the bars alternately elastically elongate and contract at the frequency of operation of the wave generator. In practice, the bowl 14 is lowered by its hoisting mechanism until the toothed end portions 26 of the bars and the cutting edge of scraper blade 22 are in engagement with the earth to be penetrated and loaded into the bowl. The ends of the bars and cutting edge are, of course, lowered so as to take the desired depth of cut, which may be variable depending upon conditions encountered in the field, but which may be deeper than heretofore usual. The extremities 26 of the bars and the cutting edge of the blades 21 being in the desired engagement with the earth, generators 30 are driven to set the bars into the described mode of standing wave operation, and tractor 11 is driven ahead so as to bring the forward extremities of the bars 24 into pressural engagement with the earth material to be disintegrated. The bars 24, undergoing the described standing wave vibration while their ends are pressed against the earth material, act to radiate sonic waves into the earth.

These sonic waves, which are of comparatively large amplitude, comprise successive half-cycles of compression and rarefaction or tension, and repeated cyclic rarefaction or tension phase of the wave causes the earthen material to fail or disintegrate as a result of elastic fatigue. It has already been explained that earthen material is inherently weak in tension, and a repeated tension half-cycle results in rapid cutting or disintegration of the earth material ahead of the bars. The bars thus break up large earthen or rock masses, being particularly effective on hard formations. In addition, the sonic waves radiated into the earth cause the loosened earth material to become dynamically fluidized and suspended, and of high, fluid-like mobility, such that the mass of earthen material immediately in front of the blade, and which is to be loaded into the bowl over the blade, travels over the advancing blade and is loaded into the bowl with reduced friction and therefore increased mobility. Loading of the material into the bowl is thus accomplished with increased facility. In particular, necessary tractor effort is reduced, as mentioned hereinabove. Because the earth material is fragmented ahead of the blade, the blade penetrates into the material with considerably reduced effort. Deeper cuts may thus be taken, and at the same time, blade depth and orientation are less critical.

FIG. 3 shows a modified arrangement wherein the extremities 26' of the bars, here designated by numeral 24', terminated fairly closely adjacent to the cutting edge of the blade. In this case, the sonic wave radiation has its source more closely related to the blade, improving the dynamic fluidizing effect of the radiated sonic waves on the loosened earth material immediately in the region of the blade. It might incidentally be mentioned in connection with the sonic wave radiation property of the bars 24 and 24', that while the sonic wave activity primarily responsible for disintegrating the rock ahead of the bars is radiated principally from the sharpened front edges of the bars, the bevelled front faces of the bars also act to radiate sonic waves into the earth material thereadjacent and contribute substantially to the dynamic fluidizing effect on the earthen material which is relied on to improve the loading of the material into the bowl.

In FIG. 4 is shown a modification of a portion of FIG. 2. Parts in FIG. 4 corresponding to parts in FIG. 1 are identified by the same reference numerals, but with the suffix "a" added. In this case, the half-wavelength vibratory bars 24a are rigidly clamped to the bottom wall 16a of the bowl at points spaced near but somewhat forwardly along the bars from their mid-point nodal regions, where a substantial component of longitudinal vibration occurs, but not the extreme vibration found at the extremities of the bars. For this purpose, fixtures 34 shrunk-fit onto the bars are rigidly mounted on the bottom wall 16a of the bowl, as shown. Also in this case, the bars are preferably not fixed in the mounting fixtures 25a, so that freedom for vibratory motion of the rearward wall of the bowl is permitted. In other words, the bars 24a have working clearance in the fixtures 25a permitting relative motion therebetween.

The bars 24a are thus coupled to the bottom wall of the bowl at points along the bars having a substantial component of vibratory motion, and sonic waves, of the frequency delivered by the generators, are transmitted into the bottom wall 16a of the bowl, and at selected frequencies set up a complex sonic standing wave pattern therein and in the remaining connected structure of the bowl. The walls of the bowl, as usually constructed in practice, have various regions or areas, particularly within the bottom wall 16a, which are elastically vibratory in the plane of the wall, and various other regions which are braced or thickened, or of locally increased mass, such as contributed by ribs, mounting structures, or the like. It also has regions which are fastened to frame structure of its carrying unit. These features will of course vary widely in different bowl structures. In any given case, however, the bowl, receiving vibratory impulses from the bars 24a at a location along the bottom wall 16a, spaced rearwardly from the blade, for example, as indicated in FIG. 4, will be set into sonic standing wave vibration at some selected vibration frequency. This standing wave will occur in a complex pattern of two dimensional distribution with spaced antinode regions, of maximum vibration amplitude, and intervening nodal regions, of minimized vibration amplitude. The point of attachment of the bars 24a to the bottom wall 16a becomes substantially a velocity antinode region of the wave pattern in the bowl and the vibration imparted to the bowl in this region is transmitted to the free forward edge of the wall 16a, where the blade 21a is located, and causes the latter to vibrate in a forward and rearward direction. Thus the blade itself, in this modification of the invention, vibrates against the earth material at the sonic vibration frequency, and acts to disintegrate the earthen material, as well as to fluidize it and thereby facilitate its loading into the bowl. Moreover, the entire bottom of the bowl becomes insonified, so that the described sonic fluidizing action is maximized.

The length of the bars 24a should in this case be such as to have a resonant frequency which corresponds to a natural frequency at which the bowl will vibrate with a fairly strong sonic standing wave pattern. Depending upon the design of the bucket, its mode of vibration may be essentially of the lumped constant type, or of the distributed constant type, as described hereinabove.

It is important to give some attention to the matter of impedance match between the bars 24a and the bowl at the point of interconnection therebetween. Impedance, in this connection, is the ratio of force to vibration amplitude (or velocity). In a standing wave system the impedance is a minimum at a point of maximum motion, and is a maximum at a point of minimum motion, along the wave pattern. Since the distance from the point of attachment to the forward free end is approximately the same for the bar and for the portion of the bowl parallel to this portion of the bar it follows that the impedance will be substantially matched at the point of attachment; thus giving good energy coupling between the bar and the bowl.

It will also be seen that whereas I have here illustrated the bowl as vibrated through the standing wave bars 24a from the generator 30, it is also possible and within the scope of the invention to eliminate the bars and couple a suitable mechanical vibrator of output frequency corresponding to the desired standing wave frequency of the bowl, directly to the bowl.

It is also possible, though in general less desirable, to vibrate the bowl from a suitable generator, either through bars such as 24a, or by direct coupling, at a frequency at which the bowl vibrates bodily at a resonant frequency, which will in general be a frequency lower than that for standing wave vibration of the bowl as described in the immediately preceding paragraphs. In this case, the bowl vibrates by reason of elastic deflection of its supporting arrangements in the transport vehicle. At a certain frequency, the mass reactance of the bowl becomes equal to the elastic stiffness reactance of its supporting arrangements, and it is at this frequency that the bowl will vibrate with the bodily type of resonance. The driving vibration, which may be derived from bars such as 24a, or from a directly coupled vibrator, must of course, correspond with the frequency for such bodily resonance. The blade of the bowl, partaking of the resonant vibration of the bowl, penetrates the earthen material with increased facility, and a sonic fluidizing effect on the earthen material, such as is helpful in loading, is again attained. However, while this form of the invention is an improvement over prior practices, it is not as effective as that involving the setting up of a wave pattern in the bowl, because the lower operating frequency generally characteristic of such action means lower vibratory acceleration of the blade, and therefore less powerful activity.

In any such case, i.e., where the bars are omitted, it is deemed important to attainment of the substantial benefits of the invention that the bowl either be vibrated bodily at a resonant frequency thereof, or that walls of the bowl, particularly the lower wall and/or the blade, be vibrated in an elastic vibratory system of the standing wave type. The system may have lumped constants, or be essentially of the distributed constant type. In cases in which the longitudinally vibratory bars are used, the bowl or blade may either be non-vibratory, or either bodily or elastically vibratory. In any such case, elastic vibration of the bowl is of greatest advantage, but bodily vibration at resonance may also be used. Also, in any such case, mere forced vibration of the bowl or its blade, without resonance or sonic wave pattern, in combination with use of the vibratory bars, is within the scope of the invention. As stated hereinabove, mere forced bodily vibration of the bowl or blade, without elastically vibrating members, resonance or sonic standing wave pattern, and without use of the vibratory bars, is disclaimed as a part of the invention.

In FIGS. 5 to 9, inclusive, I have shown a dozer equipped with improvements in accordance with the invention. The dozer, generally indicated by the numeral 40, may be entirely of a conventional type excepting for addition of sonic vibration means in accordance with the invention. Thus it may comprise a two-wheeled transport vehicle 41, equipped in the usual manner with push arms 42 projecting forwardly of the vehicle and carrying at their forward ends a concave dozer blade 43. The framework supporting blade 43 includes upright end walls 44 secured to the forward ends of push arms 42, as shown. Half-wavelength vibratory bars 45 project downwardly and forwardly through suitable apertures in blade 43, being mounted at their midpoints in a mounting fixture 46 secured to the rearward side of the blade. In the illustrative design, the rearward half portions of the bars 45 are tubular in form, while the forward half portions thereof are of square cross-section, as illustrated. The juncture between the two may be at a shoulder 47, seen best in FIG. 9. The forward extremities 48 of the bars are beveled to an edge 49. The rearward ends of the bars carry vibration generators 50, details of an illustrative form of which will be presently described. The bars are clamped at their midpoints by means of split, tapered collets 52, fitting in a tapered opening 53 in a mounting ring 54, screws 55 serving to draw the collet toward the ring 54 and thereby contract the collet to tightly engage the cylindrical portion 45a of the bar. Mounting ring 54 has a flange 56 abutting the rearward wall 57 of mounting fixture 46, and screws 58 passing through flange 56 and threaded into wall 57 complete the mounting of the bar.

The cylindrical half portion 45a of each bar, together with its vibration generator 50, are enclosed by a cylindrical case 59, the forward end of which may have a flange 60 secured to the flange of mounting ring 54, as shown. Casing 59 is pressure-tight, and carries air under pressure for operation of generator 50. Air under pressure is introduced to the casing via a conduit 62 coupled into the head of casing 59 as at 63. The air pressure in casing 59 is moderate, not being over the order of 100 lbs. per square inch. The splits 52a in collet 52 are narrow, and effectively closed against leakage of air pressure when the collet is clamped tightly in place. However, to guard against possible leakage, a sealing O-ring 64 may be placed in the bottom of ring 54 below the lower end of the collet.

Air supply conduits 62 lead from a header 65 (FIG. 5), supplied with air under suitable pressure from an air compressor plant generally indicated by the numeral 66.

The vibration generator 50, in a preferred illustrative form, is shown in detail in FIGS. 7 and 8. A cylindrical casing 68, having an inturned head flange 69 at the top, snugly receives a body 70 having a circular head wall 71 at the top and a circular bottom wall 72 at the bottom, the peripheries of these walls being sealed to casing 50 as by O-ring seals as shown. Body 70 extends the full width of the casing 68 as seen in FIG. 8, but in the aspect of FIG. 7 is narrowed to form a bridge-like intermediate wall 72, affording air chambers 73 on each side thereof as shown.

Preferably, a device 74 for reducing lateral components of vibration is mounted atop casing flange 69. This device comprises a bottom wall 75 mounted on flange 69, a parallel top wall 76, and an intermediate ring 77, the parts being secured in assembly by screws 78. In the chamber 79 thus formed is placed a somewhat massive plate 80, the circumference of which has a fairly good clearance with the inner surface of ring 77. In the event that lateral vibration should tend to occur, plate 80, acting as an inertia mass, slides on the upper surface of plate 75, and the friction so developed functions as a strong deterrent to lateral components of vibration.

Bridge wall 72 is formed with a pair of horizontally spaced horizontal bores 82 and side plates 83, secured to wall 72 as by screws 84, have cylindrical plugs 85 extending into bores 82 and pressure sealed therein as by means of O-ring seals, as shown. The inner ends of opposed plugs 85 are spaced, as shown, and disposed in the bores 82 with a close fit between the plugs 85 are race rings 87. The cylindric chamber 90 inside each ring 87 contains a cylindrical inertia rotor 91, of a diameter preferably somewhat greater than the radius of the inner diameter of the ring 87, and of slightly less width than the distance between opposed plugs 85. A plurality of air channels or grooves 92 are cut in opposite sides of each of rings 87, and these are directed tangentially to the chambers 90. These grooves act as air nozzles, introducing air under pressure to chamber 90 in tangential directions in a manner to drive rotor 91 orbitally about the inner periphery of ring 87.

The outer ends of nozzle grooves 92 are in communication with channels 95 formed in wall 72 around plugs 85. Pressure air is introduced to channels 95 via bores 96 extending upwardly therefrom through the upper end of body 70 to the space 97 inside casing flange 69. Air under pressure enters the latter chamber through slots 98 formed in casing flange 69. It will be recalled that the space around the generator contains pressure air, and this pressure air enters via the slots 98, and is led to and through the nozzle groove 92 into rotor chamber 90 as already described. Spent air leaves chamber 90 via ports 99 centrally located in plugs 85. This air thus passes to chambers 73, and thence flows through a transverse passage 100 in the bottom portion of wall 72 to a vertical passage 101 formed in a tubular stem 102 extending downwardly from body 70.

Stem 102 is tightly mounted in the upper end of cylindrical bar portion 45a, as shown. The lower portion of stem 101 has a taper-threaded portion 103 which is engaged with taper threads 104 formed in member 45a. Above threaded section 103 is a portion 105 of reduced diameter, at the top of which is a portion 106 of increased diameter snugly fitting in the entrance opening to tubular member 45a. In addition, the upper end of member 45a engages firmly under generator body 70. The juncture as thus described is firm and secure notwithstanding the vibratory action which it must undergo in service.

It will be observed that the nozzle grooves 92 are so directed as to introduce pressure air into chambers 90 with opposite directions of spin. The jets of air issuing from grooves 92 spin circularly about the chambers 90, and, impinging on the rotors 91, drive them in opposite directions at a relatively high spin frequency in orbital paths guided by the inner surfaces of race rings 87.

Sonic wave generators of this general class were disclosed and claimed in my co-pending application Serial To. 848,627 filed January 28, 1955, now abandoned, entitled, Apparatus and Method for Generating and Transmitting Sonic Vibrations. The operation thereof will, however, be briefly explained herein. In general, pressure fluid introduced into the two inertia rotor chambers 90 causes orbital motion of the two inertia rotors 91, each of which exerts a centrifugal force on its corresponding race ring 87. The rotating force vectors so exerted on the race rings are of course transmitted to the body 70, and thence to the longitudinal bars 45. The rotors 91 are automatically synchronized to operate in like phase, i.e., so that the rotors have their vertical components of motion in step with one another, as presently to be described. Incidently, it will be seen that owing to opposite spin directions, the rotors, if synchronized, must move with horizontal components of motion in step with one another, but always in opposed directions, with the desirable consequence that laterally exerted components of force are always equal and opposed and therefore balanced out. Synchronization of the rotors 91 results from their being connected through the generator body 70 with the longitudinally elastic vibratory bar 45. When the inertia rotors are driven by the pressure fluid at a spin frequency approaching or approximately the resonant frequency of the bar 45 for the described mode of half wave longitudinal standing wave vibration, the bar 45, as a result of some initial force impact received from the generator, is started into its longitudinal mode of standing wave vibration. The generator 50 on the end of the bar 45 then undergoes longitudinal vibration at the standing wave frequency of the bar 45. As a result of this longitudinal vibration of the generator the rotors 91 begin to synchronize automatically with one another. As the rotors come into better and better phase correspondence as a result of this action, the standing wave in the bar 45 becomes stronger and stronger. The process builds up until bar 45 vibrates at its maximum amplitude and rotors 91 are perfectly synchronized.

Briefly summarized, therefore, the vibration generator 50 applies to the rearward end of the bar 45 an alternating force directed longitudinally thereof, and is regulated to do so at the frequency for half wave longitudinal standing wave vibration of the bar. It is of course necessary that the air pressure delivered to the vibration generator be such as will drive the inertia rotors 91 at a spin frequency approximating a half-wavelength vibration frequency of the bars. When this has been accomplished, the rotors 91 "lock in" at the resonant frequency in synchronism with one another.

Exhaust air may be discharged from the vibration generator in various ways, but preferably, the discharge from the hollow generator stem is conducted through the hollow bar 45 to a discharge orifice 109 in the beveled extremity 48 of the bar. The air jet issuing from this discharge orifice acts to stir up and blow away from the point of attack earthen material loosened by the bar.

It will be understood that the sonically vibrating bars 45 act to disintegrate the earthen material ahead of the scraper blade, acting much as the bars 24 of the embodiment of FIGS. 1 and 2. The earthen material thus disintegrated or broken up ahead of the blade is handled by the latter with greatly increased ease.

The vibratory bars 45 need not, in the application of FIGS. 5 and 6, be synchronized with one another. However, using vibration generators of the type shown in FIGS. 7–9, they will do so automatically as a result of the intercoupling provided therebetween through the blade 43. While the vibratory motion of the blade as a consequence of vibration of bars 45 is minimal, there is enough vibration at this point to exert a synchronizing effect on the several bars.

A further optional but advantageous feature of the invention, as illustrated in FIG. 5, is a vibration of the blade 43 in a direction parallel to its scraping edge 43a. For this purpose, I mount vibration generators 112 on the blade, or as here shown, on the end plates 44 secured to the blades, these generators of which there may be one on each end plate 44, being adapted to exert alternating forces along direction lines parallel to blade edge 43a. These generators may be of any type suitable to the purpose, and may illustratively be of the same general nature of the generators 50 heretofore described. As shown, the generators are supplied with air under pressure through conduits such as 113 leading from header 165. The generators 112 may operate simply to vibrate the blade 43 bodily along a direction line parallel to a scraping edge 43a, thus causing the latter to have a slicing action on the earth material as it moves against it. A better cut is thereby taken. I may also operate the generators 112 in a manner to set up a half wave longitudinal standing wave in the blade 43. In such case, the central area of the blade remains substantially stationary, but the two half portions thereof on either side of center alternately elastically lengthen and contract with high acceleration, such action again, of course, taking place parallel to scraping edge 43a. The increased accelerations so obtained improve the shearing action of the blade on the earth material encountered by edge 43a. No problem is encountered as regards synchronization of the two generators mounted on the two ends of the blade, this occurring automatically as the vibratory action develops in the blade.

FIGS. 10 and 11 show an illustrative application of the invention to a ripper bar machine. A two-wheeled vehicle 120 has a fairly heavy platform 121 which includes a rearward portion 122 mounting a pair of ripper bars 123, and a forward portion 124 coupled as at 125 to the drag element 126 of a tractor machine, not shown. It will be understood that the element 126 is designed for vertical adjustment to accomplish proper engagement of the lower extremities of bars 123 with the earth, or to elevate the bars 123 sufficiently for adequate road clearance during towing when not in service.

The bars 123 are again half-wavelength standing wave vibration members, being tightly mounted at or near their midpoints in fittings 128 secured to platform 121 in positions inclined somewhat rearwardly from vertical, as clearly shown. The forward extremities of the bars 123 are beveled, as indicated at 129, and their rearward or upper extremities carry vibration generators 130, which may be of the same type shown in FIGS. 7 and 8. Referring to FIG. 11, generator casing 132 is snugly embraced by pressure tight casing 133, including dome 134 into which is coupled air supply conduit 135 leading from a suitable compressor plant, not shown. The tubular air discharge and mounting stem 136 of the generator is fitted tightly in the upper end of bar 123, and air is exhausted via passage 137 leading outwardly to one edge of bar 123.

The generators 130 will be understood to be operated to set up half-wavelength standing wave vibration of the bars 123. In operation, platform 121 is manipulated to engage the relatively sharp edges 138 on the forward and lower extremities of the bars with the earth, causing ripping and disintegration of the earth material ahead of the bars in accordance with principles heretofore explained.

It may here be noted that the form of vibration generator shown in FIGS. 7 and 8, enclosed in a casing and filled to the ends of vibratory bars as indicated in FIG. 11, may be used for the generators 30 of FIGS. 1 and 2.

In FIGS. 12 and 13 is shown an application of the invention to a dipper shovel. A dipper shovel of conventional nature is diagrammatically indicated at 145, and is of a type having crawler unit 146, turntable 147, and revolving superstructure 148 including cab 149. Boom 150 is pivotally mounted at 151 on suitable support brackets carried by the deck of superstructure 148, and supports the usual stick 152 extending upwardly and rearwardly from bucket 153. The bucket 153 may be of more or less conventional structure, including bottom wall 155 terminating in earth engaging lip 155a, excepting for the addition of longitudinally vibratory half wave bars 154 mounted at their midpoints on the bottom wall 155 of the bucket.

The bars 154 are again half-wavelength standing wave bars, toothed or beveled at their forward extremities 155 which project forwardly of wall 155 and mounting sonic wave generators 156 at their rearward ends, as shown. Mounting fixtures 157 secure the midpoints of the bars rigidly to bucket wall 155. The bars 154 are vibrated in the same manner as the bars 24 of FIGS. 1 and 2, and, in cooperation with bucket edge or lip 155a, perform functions as regards disintegration and loading of earth which are analogous to those fully described in connection with the scraper of FIGS. 1 and 2. Because of the shorter length of the bucket mounted bars 154, the vibration frequency is, however at a higher level.

In FIG. 14 is shown a modification wherein the bars 154a are longer, and are mounted to the bucket wall 155a at a point forward of their midpoints. In a manner analogous to that described in connection with FIG. 4, this arrangement makes possible a resonant vibration of the bucket structure. As described in connection with FIG. 4, the bucket may be bodily vibrated at resonance, or, to greater advantage, elastically vibrated, with the creation of a standing wave pattern within the bucket structure. The higher vibratory accelerations incident to elastic vibration greatly improve the performance. The modification of FIG. 14 also shows a reversed bevel on the extremities of the bars, which may, if desired, be used on the bars of FIGS. 12 and 13.

A suitable vibration generator for the bucket of FIGS. 12 and 13 is shown in FIGS. 15–17. As there shown, the rearward end of each bar 154 is formed with a cylindric housing portion 160, into which is tightly fitted a ring 161 which defines the outer periphery of a rotor chamber 162. Fitted tightly in the two ends of rings 161 are side plates 163, the inner surfaces of which define the sides of the aforementioned chamber 162. An axle shaft 164 is set axially into side plates 163, and surrounding said shaft 164 is the hub 165 of a bladed air-driven impeller or turbine wheel 166. The latter has a medial, circular wall 167 extending radially from hub 165, and wall 167 is formed on opposite sides thereof with angularly disposed turbine blades 168 adapted to be impinged upon by presently described air jets. Hub 165 is of substantially greater inside diameter than the exterior diameter of shaft 164, being nearly twice the diameter of the latter as shown in the illustrative embodiment.

Air under pressure is jetted tangentially into chamber 162, so as to impinge on turbine blades 168, via nozzle passages 170 formed in side plates 163. Spent air is exhausted through ports 169. The passages 170 lead inwardly of plates 163 from the outer peripheries thereof, so as to open through the inside surfaces of plates 163 in directions tangentially of chamber 162, and against turbine blades 168. The outer ends of passages 170 communicate with circumferential grooves 171 formed inside ring 161, and said grooves 171 communicate via ports 172 in ring 161 with a pair of air passages 173 extending longitudinally through the rearward half of bar 154 to substantially the midpoint of the latter. There, the passages 173 communicate with a passage 174 registering with a passage 175 in bar mounting fixture 167, the outer end of passage 175 having coupled thereto an air supply conduit 176 leading from an air compressor plant 177 mounted on the superstructure of the shovel, forwardly of cab 149. The conduits 176 may be suitably guided up the stick 152 to boom 150, and thence downwardly to the compressor plant, in any suitable fashion, for instance as indicated in FIG. 12.

The air driven turbine wheel 166 comprises, in effect, an inertia ring which, when driven by the jets of air issuing from nozzle passages 170, spins in chamber 162, with a gyratory motion about axle shaft 164. Vibration generators of this general type are disclosed in my aforesaid co-pending application. Suffice it to say here that the gyrating rotor 167 exerts a centrifugal force on axle shaft 164, and therefore on side plates 163 and housing 160. The resulting rotating force vector has a component of alternating force longitudinally of the bar 154 and, when the air pressure is regulated to a valve causing ring 166 to have a spin frequency approximating the resonant frequency of bar 154 for longitudinal standing wave vibration, the system locks in at that frequency and the bar 154 is driven at maximized amplitude. Components of vibration laterally of bar 154 are not bothersome, since the resonant frequency for lateral vibration differs substantially from the resonant frequency for longitudinal vibration, and by establishing the spin frequency of the rotor near the resonant frequency for longitudinal vibration, lateral components will not be resonantly amplified, and create no problem.

A number of illustrative embodiments and applications of the invention have now been illustrated and described. It will of course be understood that these are merely for illustrative purposes, and that various changes in design, structure and arrangement, as well as many additional applications to other forms of earth moving machinery, are within the spirit and scope of the invention and are intended to be included within the scope of the appended claims.

I claim:
1. The method of fragmenting earth material and facilitating the loading thereof into a shell of an earth moving machine, that comprises: moving the shell against the earth, generating sonic, elastic waves in an elastic sonic wave transmission system having vibratory mass and elasticity, and acoustically coupling said system to the earth by pressurably engaging a sonically vibrating portion thereof against the earth, thereby effecting transmission of sonic waves into and through the earth, with resulting disintegration of the earth material owing to the alternating compression and rarefaction cycle characteristic of sonic waves, and also with resulting fluidization, dynamic suspension, and mobility of the disintegrated earth material owing to said transmission of sonic waves therethrough, and consequent reduced resistance to movement thereof into the shell moved thereagainst.

2. The method of facilitating the loading of earth material into the shell of an earth moving machine, that comprises: moving the shell against the earth, generating sonic, elastic waves in an elastic sonic wave transmission system having vibratory mass and elasticity, and acoustically coupling said system to the earth by pressurably engaging a sonically vibrating portion thereof against the earth, thereby effecting transmission of sonic waves through the earth, with resulting fluidization, dynamic suspension and mobility of the earth material owing to said transmission of sonic waves therethrough, and consequent reduced resistance to movement thereof into the shell moved thereagainst.

3. A machine for loosening earth material, comprising: a transport vehicle, an earth engaging elastic bar mounted on said vehicle in a position such that an end thereof is engageable with the earth material upon forward movement of said vehicle, and means for setting up elastic longitudinal standing wave vibration of said bar while said vehicle is moved in a direction to engage said bar with the earth.

4. A machine for breaking and moving earth material, comprising: a transport vehicle, an earth engaging blade carried by said vehicle, an elastic bar mounted on said vehicle in a position such that an end thereof is engageable with the earth forwardly of said blade upon forward movement of said vehicle, and means for setting up elastic longitudinal standing wave vibration of said bar while said vehicle is moved in a direction to engage said bar with unbroken earth material, whereby the earthen material is fragmented and fluidized, and the fragmented and fluidized earth engaged by said blade.

5. In an earth moving machine, the combination of a shell having a bottom wall terminating forwardly in an earth engaging lip, longitudinally elastic earth engaging bars mounted on said shell and having forward extremities projecting forwardly of said lip, means for setting up elastic longitudinal standing wave vibration of said bars, and means for moving said shell to engage said extremities of said bars and said lip with the earth material.

6. The subject matter of claim 5, including also means for resonantly vibrating said shell in a manner to impart vibration to said lip in a forward and rearward direction.

7. The subject matter of claim 5, including also means for establishing a sonic wave pattern in said shell, with a component of forward and rearward motion at said lip.

8. In an earth moving machine, the combination of: a shell having a bottom wall terminating forwardly in an earth engaging lip, elastic supporting means for said shell elastically deformable to permit vibration of said shell, and sonic wave generator means coupled to said shell for vibrating said shell on its elastic supporting means in a direction to include a component of forward and rearward vibration for said lip.

9. In an earth moving machine, the combination of a shell having a bottom wall and an earth engaging lip adjacent the forward portion of said wall, and means for establishing a sonic standing wave pattern in said shell, with a component of forward and rearward motion at said lip.

10. A machine for loosening earth material, comprising: a transport vehicle, an elastic earth engaging member mounted on said vehicle to engage the earth upon forward movement of said vehicle, and means for setting up elastic sonic deformation waves in said member while said vehicle is moved in a direction to engage said member with the earth, all so constructed and arranged that said member radiates sonic waves into the earth material to separate a body of the earth from its natural adhesion to the earth, and to radiate a sonic field in said separated body of earth to sonically fluidize said body.

11. The subject matter of claim 10, wherein said elastic earth engaging member comprises a blade.

References Cited in the file of this patent

UNITED STATES PATENTS

| | | |
|---|---|---|
| 1,559,709 | Knapp | Nov. 3, 1925 |
| 2,228,445 | De Velbiss | Jan. 14, 1941 |
| 2,443,492 | Austin | June 15, 1948 |
| 2,445,934 | Bodine | July 27, 1948 |
| 2,554,005 | Bodine | May 22, 1951 |
| 2,614,476 | Jennings | Oct. 21, 1952 |
| 2,619,748 | McIntosh | Dec. 2, 1952 |
| 2,831,668 | Skowronski | Apr. 22, 1958 |
| 2,850,815 | Edwards | Sept. 9, 1958 |
| 2,859,952 | La Tour et al. | Nov. 11, 1958 |
| 2,911,951 | Swanson | Nov. 10, 1959 |

FOREIGN PATENTS

| | | |
|---|---|---|
| 328,629 | Great Britain | Apr. 30, 1930 |
| 605,680 | Great Britain | July 28, 1948 |
| 740,468 | Great Britain | Nov. 16, 1955 |